United States Patent [19]

Jackson

[11] Patent Number: 4,995,648
[45] Date of Patent: Feb. 26, 1991

[54] LOCKING FLANGE CLIP

[75] Inventor: Roy J. Jackson, Mona Vale, Australia

[73] Assignee: Bullock Mfg. Pty. Ltd, Rydalmere, Australia

[21] Appl. No.: 400,090

[22] Filed: Aug. 29, 1989

[51] Int. Cl.$^5$ .............................................. F16L 23/00
[52] U.S. Cl. .................................... 285/406; 285/424; 285/921
[58] Field of Search ................ 285/406, 424, 364, 921

[56] References Cited

U.S. PATENT DOCUMENTS

| 4,133,566 | 1/1979 | Miller | 285/364 X |
| 4,509,778 | 4/1985 | Arnoldt | 285/406 |
| 4,542,923 | 9/1985 | Lacrosse | 285/424 |
| 4,725,083 | 2/1988 | Schauer | 285/424 X |

FOREIGN PATENT DOCUMENTS 720375 12/1954 United Kingdom ................ 285/424

Primary Examiner—Dave W. Arola
Attorney, Agent, or Firm—Ladas & Parry

[57] ABSTRACT

A locking clip (1) for air conditioning ducting or the like where the ducting (13, 14) is of the type which has flanges (11, 12) protruding upwardly and generally at right angles from the ends of the ducting. The clip 1 is adapted to clamp the outer faces of the flanges (11, 12) at the same time, resist sliding of the clip (1) along the mated flanges (11, 12) by the action of central tabs (5, 6) protruding from the spine (4) of the clip (1) between the inside, mating faces of the flanges (11, 12). In one form serrations on the ribs (5, 6) help to maintain frictional engagement between the ribs (5, 6) and the inside faces of the flanges (11, 12).

The locking clip (1) is particularly suited to use with clip arrangements on air conditioning duct so as to improve the resistance of such clips to creep along the mating flanges (11, 12) under the influence of gravity, vibration and the like.

12 Claims, 3 Drawing Sheets

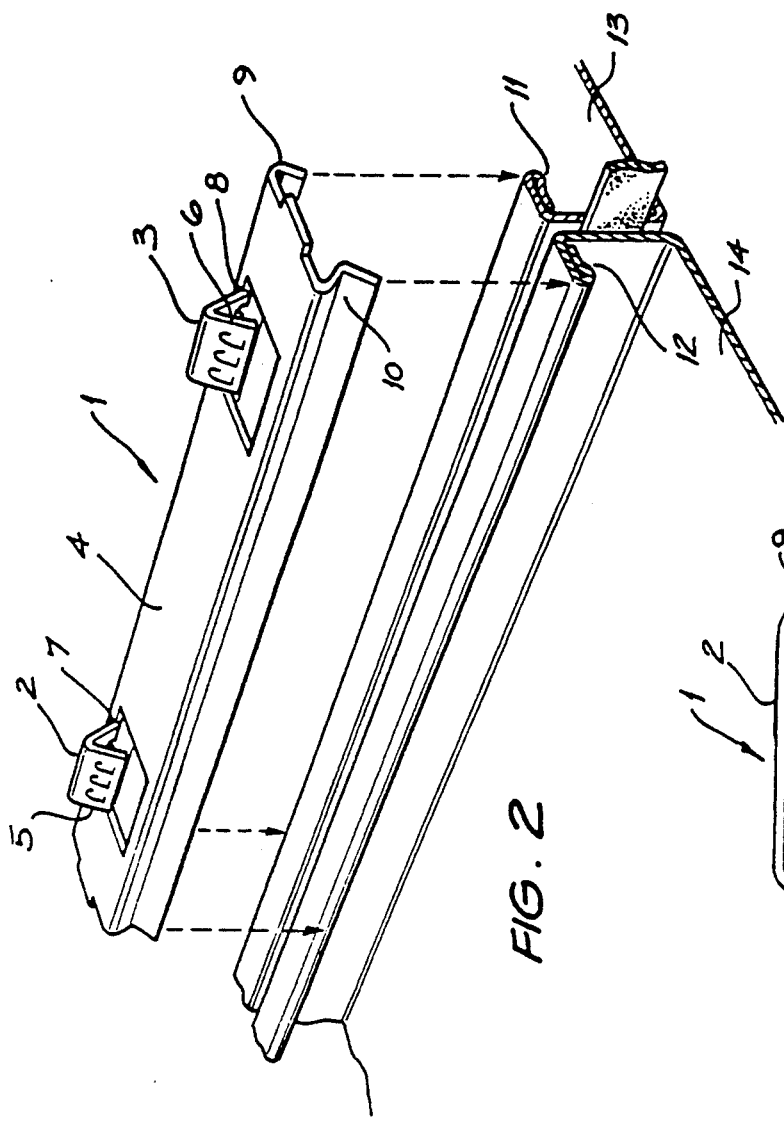
FIG. 2
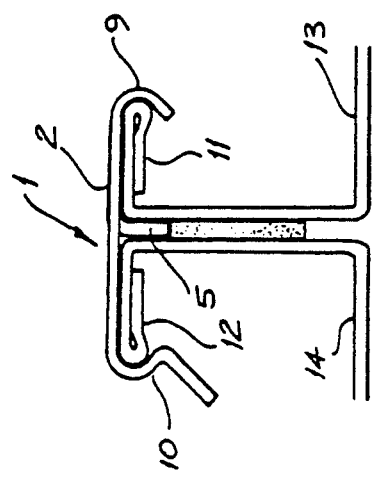
FIG. 5
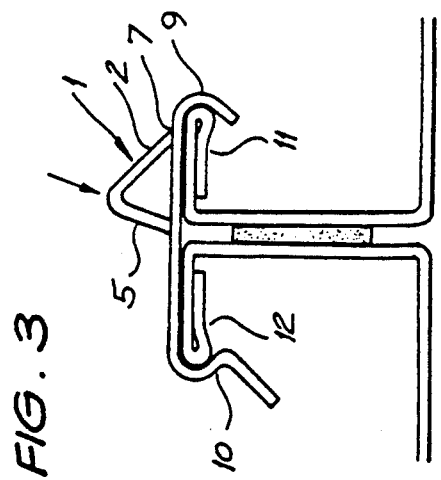
FIG. 3
FIG. 4

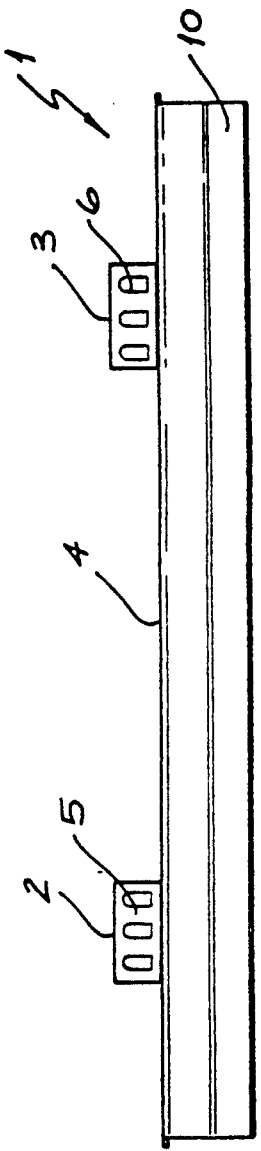
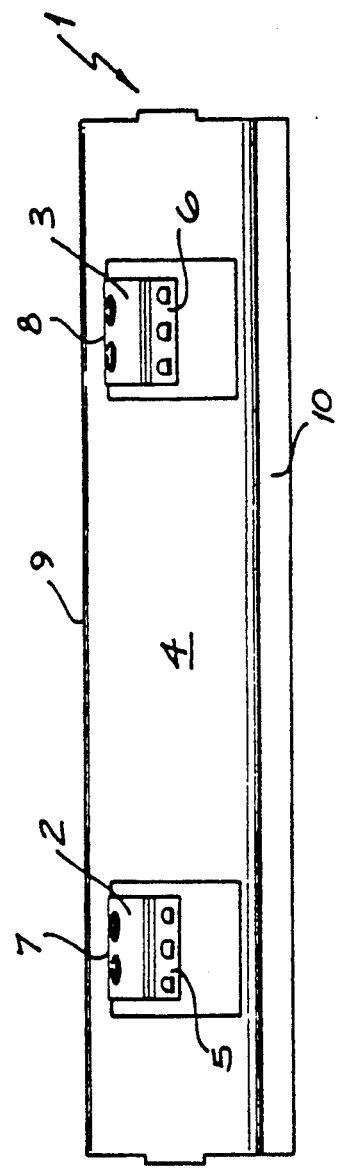
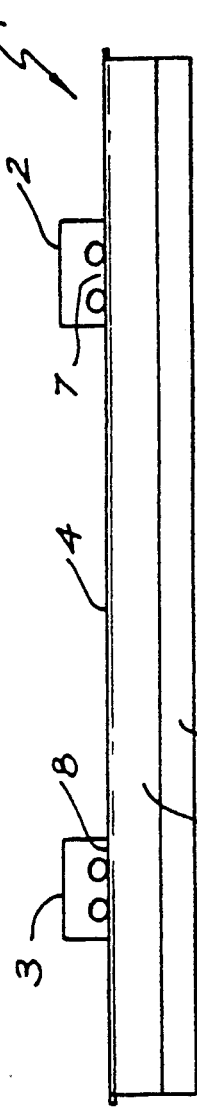
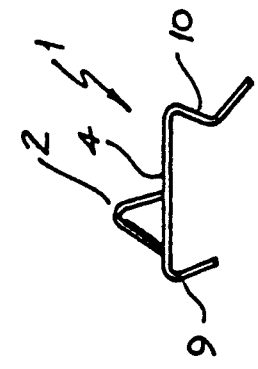

LOCKING FLANGE CLIP

The present invention relates to clips used to bind flanges of ducting together and, in particular, to such clips adapted to bind the flanges in a locking, slide-resisting manner.

In the air conditioning duct joining art a commonly used duct in high-rise buildings and the like is a generally square or rectangular cross-section steel duct having flanged ends which, when abutted, are bound together so as to join the abutting duct sections by means of generally elongate clips which act against the outer edges of the abutting flanges so as to press them together in a sealed, mechanically linked arrangement.

These type of clips have a tendency so slide along the flanges that they are clipping together, particularly where the ducts vibrate under the influence of internal moving air and particularly where the clips are not installed in the horizontal plane.

It is an object of the present invention to overcome or substantially ameliorate the abovementioned disadvangages in relation to such clips applied to such ducts.

BRIEF DESCRIPTION OF THE INVENTION.

Accordingly, in one broad form, there is provided a locking clip for air conditioning ducting wherein said ducting is of a type which has flanges protruding outwardly and generally at right angles from the ends of said ducting; said flanges adapted to abut adjacent flanges of abutting like duct; said locking clip being an elongate structure adapted to bind together adjacent, abutting ones of said flanges; the improvement comprising said locking clip further including at least one downwardly extending central rib portion which is inserted between and frictionally engages the inside, abutting faces of said adjacent, abutting flanges when said locking clip binds together said adjacent, abutting ones of said flanges.

Preferably said clip includes side ribs which shroud and frictionally bind the outer faces of abutting, adjacent flanges.

Preferably said central rib portion is serrated.

Preferably said central rib portion is connected at an acute angle to a tab protruding slightly upwardly from the central spine of said clip.

Preferably said tab is attached to said spine along a tab bend line parallel with but slightly offset from the centre line of said spine.

Preferably said tab and central rib portion are formed from and out of the material of the central spine of said clip.

Preferably said clip is made of metal. More preferably said metal is galvanized mild steel.

Preferably said tab is perforated along said tab bend line by a series of equally spaced holes, thereby facilitating manual bending of said tab about said tab bend line.

Preferably the number of said tab and central rib portion assemblies is two which are spaced apart along said spine.

Preferably said central rib portion is approximately 15 mm in length by approximately 1mm in thickness and extends approximately 5 mm into the space between said abutting flanges when installed.

Preferably said central rib portions are spaced approximately 80 mm apart along said spine.

Preferably said clip is manufactured from a single piece of elongate, strip material with said tabs and central rib portions punched therefrom; thereby creating apertures in said spine through which said central tab portions project.

BRIEF DESCRIPTION OF THE DRAWINGS.

The invention will now be described with reference to the drawings wherein:

FIG. 2 shows the clip of the first embodiment aligned for application to the butting duct ends, FIG. 3 shows a first step in the application of the clip of FIG. 2 to the abutting duct ends, FIG. 4 shows the next step in applying the clip of FIG. 2 to the abutting duct ends, FIG. 5 shows the final step with the central tabs knocked into place, FIG. 6 shows an ends view of the clip of FIG. 2, FIG. 7 shows a front view of the clip of FIG. 2, FIG. 8 shows a top plan view of the clip of FIG. 2, and FIG. 9 shows a rear end view of the clip of FIG. 2.

Figure 1:
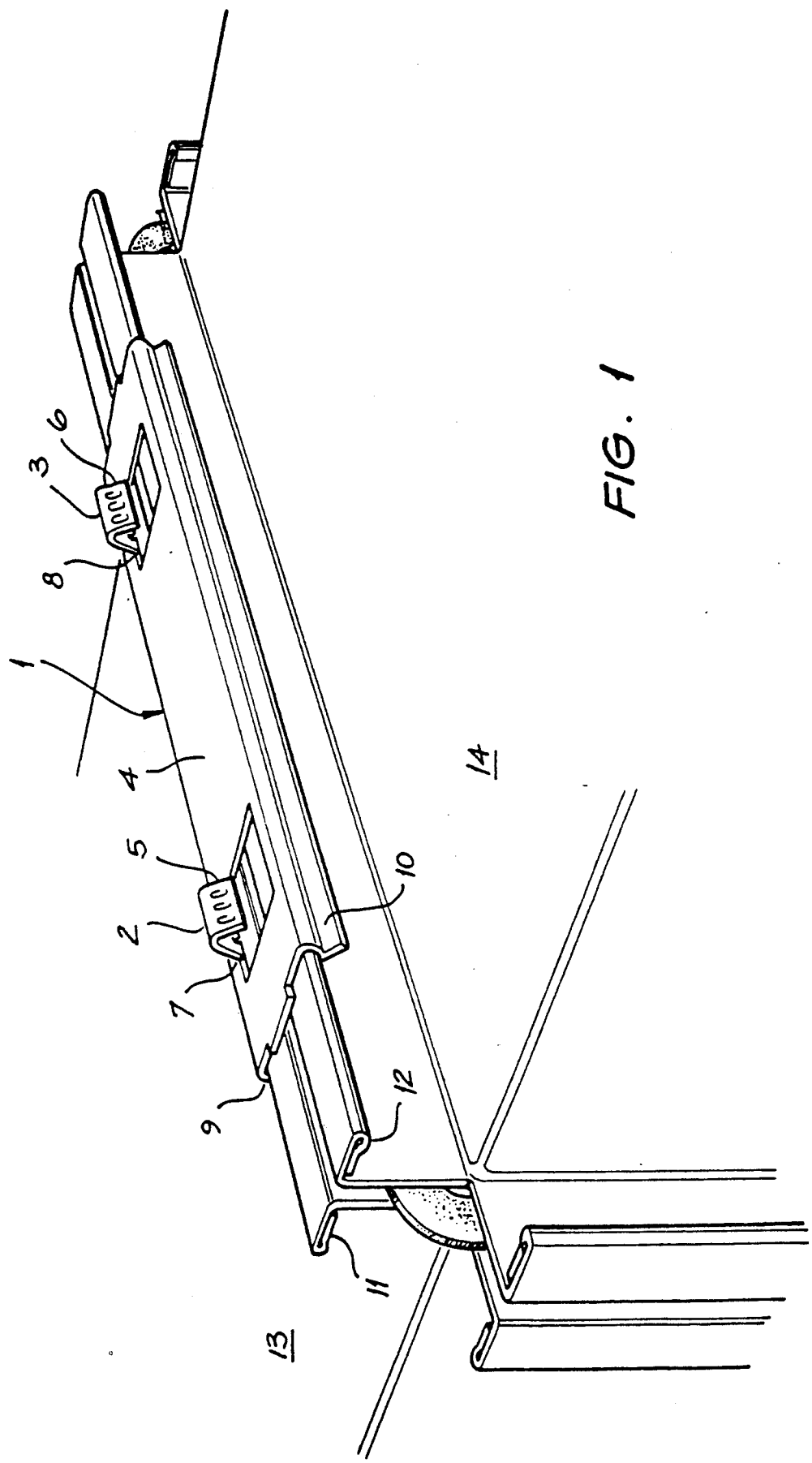
FIG. 1 shows a perspective view of a locking clip of a first embodiment, installed on abutting duct ends (prior to tab knock-down)

DETAILED DESCRIPTION OF FIRST EMBODIMENT.

Referring to FIG. 1 there is shown an elongate clip 1 with two tabs 2, 3 located generally along the spine 4 of the clip 1.

Projecting downwardly from the non-attached ends of the tabs are respective ribs 5, 6 which have a generally serrated structure.

The tabs 2, 3 are connected to the spine 4 along tab bend lines 7, 8 having perforations in the form of spaced small holes passing therethrough. These perforations aid in the bending of the tabs 2, 3 about the respective fold lines 7, 8 during the rib insertion operation to be later described below.

The clip 1 has side ribs 9, 10 which clamp over and mechanically bind (by mechanical, resilient urging) adjacent, abutting flanges 11, 12 of adjacent, abutting duct portions 13, 14.

Prior to installation the tabs 2, 3 are raised slightly proud of the top surface of the spine 4 and make a generally acute angle with the downwardly extending ribs 5, 6. The downwardly extending ribs lie along the longitudinal centre line of the clip 1.

In this first embodiment the clip is made from galvanized mild steel approximately 0.8–1.2 mm thick. The tab apertures 15, 16 through which the ribs 5, 6 extend are spaced approximately 80 mm apart. The ribs 5, 6 are themselves approximately 15mm long and extend downwardly some 5 mm, this being a sufficient extension to effectively mesh between the abutting flanges 11, 12 without impinging upon any sealing strip or sealing material located lower down between the abutting flanges 11, 12. The length of the strip 1 is made to conform with the appropriate standards (usually SMACNA). In this embodiment the strip 1 has a length of approximately 170 mm, however this length will vary depending upon the size of the ducts to be mechanically bound together and upon the expected internal air pressure within the ducts 13, 14 in use.

The locking clip 1 is manufactured from a single piece of metal as a result of passing through a series of die stamping operations.

In use the duct ends 13, 14 are mated together on site and usually held in place by clips applied to corner brackets (not shown) installed at the mating corners of the ducts 13, 14. The locking clips are then applied (in numbers and spaced according to the relevant standards) to the abutting, adjacent flanges such as 11, 12 on all sides of the mating duct portions 13, 14. Once the clip has been applied in the usual manner to the adjacent, abutting flanges the tabs 2, 3 are struck with a hammer or the like so as to cause the serrated ribs 5, 6 to pass downwardly through the apertures 15, 16 and between the inside faces of the adjacent, abutting flanges 11, 12. The serrated ribs 5, 6 are dimensioned so as to frictionally engage with the inside, adjacent faces of the flanges 11, 12. In this embodiment the projection is some 5mm which is sufficient to allow the ribs 5, 6 to obtain a good grip on the inside faces of the flanges without the ribs 5, 6 extending so far between the flanges 11, 12 that they would deform any sealing material located lower down between the adjacent, abutting flanges 11, 12.

In this manner the serrated ribs 5, 6 help the clip to maintain its purchase on the adjacent flanges 11, 12 and to resist any sliding of the clip (with a due to vibration, gravity or the like) along the adjacent, clamped flanges 11, 12.

Furthermore, the clip can be applied using a hammer or the like —no special crimping tool is required.

The above describes only one embodiment of the present invention and modifications obvious to those skilled in the art can be made thereto without departing from the scope and spirit of the present invention.

For example the number of and spacing of the serrated, central ribs along the centre line of the clip 1 can be varied provided only that the appropriate resistance to creep is achieved.

While serrations are preferred on the ribs 5, 6 other forms of aid to frictional engagement of the ribs with the adjacent, inside flange surfaces can be used e.g. knurling and other forms of surface roughening.

While perforations have been shown in the first embodiment as a means of aiding bending of the tab about the tab bend lines 7, 8, the existance and nature of any aid to bending provided will depend upon the thickness of the clip material, the type of material and the specific application for the clip.

I claim:

1. A locking clip for air conditioning ducting wherein the ducting is of a type which has flanges protruding outwardly and generally at right angles from the ends of the ducting; said flanges adapted to substantially abut adjacent flanges of abutting like ducting; said locking clip comprising an elongate structure comprising a central spine adapted to be positioned over the edges of said flanges and having side ribs adapted to shroud and frictionally bind the outer faces of abutting, adjacent flanges; said central spine further including at least one downwardly extending central rib portion which is forcibly insertable between the inside, abutting faces of said adjacent, abutting flanges so as to frictionally engage therewith when said locking clip binds together said adjacent, abutting ones of said flanges.

2. The clip of claim 1 wherein said central rib portion is serrated.

3. The clip of claim 2 wherein said central rib portion is connected at an acute angle to a tab protruding slightly upwardly from the central spine of said clip.

4. The clip of claim 3 wherein said tab is attached to said spine along a tab bend line parallel with but slightly offset from the centre line of said spine.

5. The clip of claim 4 wherein said tab and central rib portion are formed from and out of the material of the central spine of said clip.

6. The clip of claim 5 wherein said clip is made of metal.

7. The clip of claim 6 wherein said metal is galvanized mild steel.

8. The clip of claim 4 wherein said tab is perforated along said tab bend line by a series of equally spaced holes, thereby facilitating manual bending of said tab about said tab bend line.

9. The clip of claim 4 wherein the number of said tab and central rib portion assemblies is two which are spaced apart along said spine.

10. The clip of claim 9 wherein said central rib portion is approximately 15mm in length by approximately 1 mm in thickness and extends approximately 5mm into the space between said abutting flanges when installed.

11. The clip of claim 10 wherein said central rib portions are spaced approximately 80 mm apart along said spine.

12. The clip of claim 1 wherein said clip is manufactured from a single piece of elongate, strip material with said central rib portion punched therefrom; thereby creating apertures in said spine through which said central rib portions project.

* * * * *